United States Patent

Schulthess et al.

[15] 3,663,890
[45] May 16, 1972

[54] TWO CAVITY LASER

[72] Inventors: Carl William Schulthess, Pomona; Eduard Gregor, Pacific Palisades, both of Calif.

[73] Assignee: Union Carbide Corporation, New York, N.Y.

[22] Filed: Apr. 27, 1970

[21] Appl. No.: 31,978

[52] U.S. Cl. ...................................................331/94.5
[51] Int. Cl. ................................................H01s 3/00
[58] Field of Search .......................331/94.5; 350/169, 172

[56] References Cited

UNITED STATES PATENTS 3,426,286  2/1969  Miller ..............................331/94.5 X
3,482,184  12/1969  Schneider et al. ................331/94.5
1,451,774  4/1923  Holbrook et al. ................350/172 X Primary Examiner—Ronald L. Wibert
Assistant Examiner—Conrad Clark
Attorney—Pastoriza & Kelly

[57] ABSTRACT

A laser system includes a single laser material with means defining a first optical cavity for producing regeneration of radiation of a first oscillating mode and additional means defining a second optical cavity for the same laser material providing regeneration of radiation of a second oscillating mode. By this arrangement, distinct first and second output beams of different mode oscillations and of the same frequency are provided from a single laser material.

8 Claims, 4 Drawing Figures

Patented May 16, 1972

3,663,890

INVENTORS:
CARL WILLIAM SCHULTHESS
EDUARD GREGOR
BY Pastoriza & Kelly,
ATTORNEYS

TWO CAVITY LASER

This invention relates generally to laser systems and more particularly to a novel laser oscillator having two optical cavities for providing distinct output beams of radiation of different oscillating modes.

BACKGROUND OF THE INVENTION

In certain laser applications, it is often desirable to split the output laser beam to provide two distinct beams of the same frequency for various operations. For example, in pulsed reflection holography, an illuminating beam is required for lighting the object of which a three dimensional film picture is to be made and simultaneously a reference beam of the same frequency as the illuminating beam is directed towards a film plane receiving reflected light from the object. Interference takes place between the reflected illuminating beam from the object and the reference beam both constructively and destructively to create the hologram in question.

In the above specific example of holography, the reference beam is preferably of a single mode or $TEM_{oo}$ oscillating mode while the illuminating beam may be a multimode oscillation. Also, the illuminating beam has from 10 to 20 times as much energy as the reference beam. In accordance with present methods, the output from a laser such as a pulsed ruby oscillator is in the form of a single mode oscillation referred to as a $TEM_{oo}$ mode. This single mode is accomplished by incorporating an aperture plate in the optical cavity of the laser wherein the normally present multimode oscillations are blocked from being coupled out of the system, the single mode being essentially defined by the aperture in the plate. This single mode is then passed through a beam splitter which is designed to reflect from one-tenth to one-twentieth the beam energy while passing from 90 to 95 percent of the beam. The larger energy beam passed through the beam splitter may then be utilized to illuminate the object of which a hologram is to be made. A diffuser plate is preferably employed to render more uniform the illumination of the object. The reference beam reflected from the beam splitter in turn is directed towards the film plane on which the hologram is to be formed.

It will be evident from the above description that much useful energy in the laser system itself is lost since the output beam from the laser system itself is of considerably reduced energy as a consequence of the aperture plate. While there ultimately results two distinct beams by passing the output through the beam splitter, to the extent that multimode oscillations in the laser optical cavity are lost the overall system is inefficient.

BRIEF DESCRIPTION OF THE PRESENT INVENTION

In accord with the present invention, a laser system is provided wherein two distinct output beams can be coupled directly out of the laser system itself so that oscillating energy in the system is utilized to maximum efficiency. By providing the two distinct output beams in the form of a multimode oscillating radiation and a single mode $TEM_{oo}$ oscillating radiation, the system is well suited to the holographic operations.

Coupling out of two distinct laser beams from a single laser material is achieved by providing two optical cavities cooperating with the same laser oscillator. Thus, for the specific holographic operation, means are provided defining a first optical cavity for the material providing regeneration of radiation of a first oscillating mode which may constitute the multimode illuminating beam and means are provided defining a second optical cavity for the same laser material providing regeneration of radiation of a second oscillating mode which might be the $TEM_{oo}$ single mode beam for reference purposes. These first and second output beams of different mode oscillations are of the same frequency.

The essence of the means defining the first and second optical cavities takes the form of an aperture plate having a central aperture and surrounding 100 percent reflecting mirror on one surface. This plate is positioned to intercept laser radiation from one end of the laser material such that its reflecting surface passes a portion of the radiation back through the laser material. A first end mirror intercepts this radiation from the other end of the laser material and reflects at least a portion of the radiation back through the material to the reflecting surface of the aperture plate. The reflecting surface of the aperture plate and first end mirror thus define a first optical cavity for the laser material.

A second end mirror which is partially transmissive is positioned to intercept laser radiation passing through the aperture and reflect a portion of the radiation back through the aperture to the one end of the laser material for further reflection back through the material from the first end mirror. This partially transmissive second end mirror and the first end mirror thus define the second optical cavity, the second end mirror serving to couple the second oscillating mode radiation out of the system.

BRIEF DESCRIPTION OF THE DRAWINGS

A better understanding of the invention will be had by referring to the accompanying drawings in which.

DETAILED DESCRIPTION OF THE INVENTION

Figure 1:
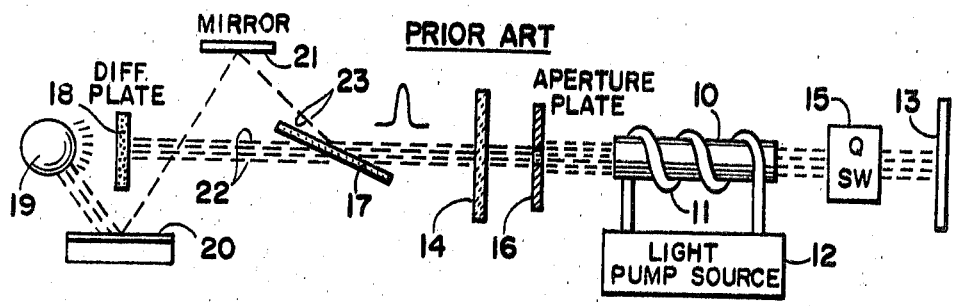
FIG. 1 is a highly schematic showing of a prior art laser system providing two output beams for holographic operations.

Referring first to FIG. 1 there is shown a typical prior art laser system for making holograms. As shown, this system includes a laser oscillator which may take the form of a ruby rod 10 surrounded by a helical flashlamp 11 powered from a source 12. First and second end mirrors 13 and 14 define an optical cavity for the regeneration of radiation from the crystal 10. A Q switch indicated at 15 is provided for the generation of giant pulses and may take the form of a Kerr or Pockels cell or may be of a passive type such as an organic dye.

In order to provide a single mode oscillating radiation beam, an aperture plate 16 is disposed in the cavity as shown such that only a single mode oscillation can pass therethrough. The end mirror 14 is partially transmissive to couple the single mode oscillation from the laser system.

In order to provide an illuminating beam and reference beam for holographic work from the system of FIG. 1, there is provided a beam splitter 17 through which from 90 to 95 percent of the beam energy passes to a diffusion plate 18 and thence to an object 19 of which a hologram is to be made. The illuminating light reflected from the object 19 strikes a film plane 20 as indicated.

The reflected portion of the output beam from the beam splitter 17 passes to a mirror 21 which directs this reference beam onto the film plane 20 wherein difraction patterns are set up by interference with the reflected illuminating beam from the object to provide the hologram. The illuminating and reference beams from the beam splitter 17 are designated at 22 and 23 and normally the illuminating beam 22 will have from 10 to 20 times as much energy as the reference beam 23.

Because of the relatively small amount of energy in the original output beam from the laser system as a consequence of the use of the aperture plate, laser amplifiers (not shown) would ordinarily be provided before passing said beam through the diffusion plate to illuminate the object. For example, in the typical arrangement illustrated in FIG. 1 the illuminating beam 22 prior to any amplification might have an energy of the order of $50 \times 10^{-3}$ joules. If the laser amplifier utilized as a maximum gain of 4, the maximum energy from such amplifier would be less than 0.2 joules.

Figure 2:
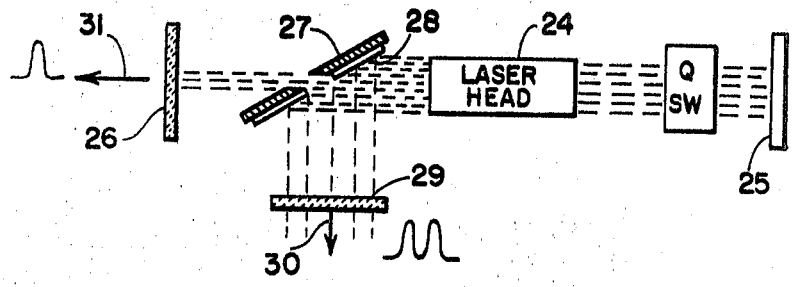
FIG. 2 is a schematic showing of a first embodiment of a laser system in accord with the present invention for providing suitable output beams which could be substituted for the system of FIG. 1 for holographic operations.

Referring now to FIG. 2 there is shown a first embodiment of the present invention for providing an illuminating and reference beam from a single laser material which could be substituted for the system of FIG. 1 thereby avoiding the need of the beam splitter 17 exterior of the laser system. Thus, there is provided a laser head designated by the box 24 which would include the laser material and helical flashlamp such as illustrated in FIG. 1. First and second end mirrors 25 and 26 define an optical cavity in a manner similar to that shown in FIG. 1 and a Q switch is provided to enable the generation of giant laser pulses.

In accord with the invention, there is provided in the first embodiment of FIG. 2 an aperture plate 27 having a 100 percent reflecting surface 28 surrounding the central aperture opening. This aperture plate is positioned between the laser material in the head 24 and the second end mirror 26 and disposed at a 45° angle. A third mirror 29 which is partially transmissive is disposed to intercept radiation from the reflecting surface 28 on the aperture plate 27 and direct this radiation back to the reflecting surface 28 and thence through the laser head 24 to the first end mirror 25. For the multimode radiation reflected from the reflecting surface 28 of the aperture, there is thus defined a first optical cavity between the mirrors 25 and 29, this cavity being L shaped. A first oscillating mode beam which in the example chosen is a multimode oscillation is coupled out of the system through the third mirror 29 as indicated by the arrow 30. The energy distribution for this first beam is indicated by the wave form adjacent to the arrow 30.

A second optical cavity for the laser material in the head 24 is defined between the first and second end mirrors 25 and 26 and provides regeneration for a second oscillating mode which in the example taken for illustrative purposes is a single mode $TEM_{oo}$ oscillation. This mode is provided by radiation passing through the central aperture of the plate 27 which radiation is ultimately coupled out of the second end mirror 26 as indicated by the arrow 31. The single mode characteristic of the radiation is indicated by the wave form adjacent to the arrow 31.

With the foregoing arrangement, suitable 100 percent mirrors may be provided to direct the respective first and second output beams 30 and 31 to an object and film plane to make up a hologram as described in FIG. 1. It will be noted, however, that substantially all of the energy generated in the laser head is utilized in providing these first and second beams. This consequence is a direct result of providing two cavities cooperating with the single laser material.

Figure 3:
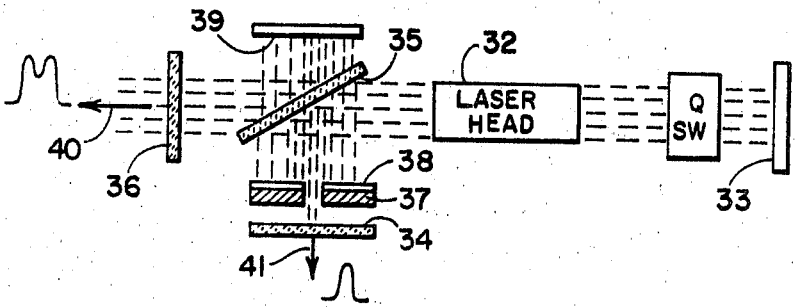
FIG. 3 is a schematic showing of a second embodiment of the invention.

Referring now to FIG. 3 there is shown an alternative or second embodiment of the two cavity laser system. In this embodiment, there again is provided a laser head 32 with a first end mirror 33 and a second end mirror 34 positioned to received a portion of radiation reflected from a beam splitter 35 disposed between the laser head 32 and a third mirror 36. An aperture plate 37 in turn is disposed between the second mirror 34 and beam splitter 35. This aperture plate includes a 100% reflecting surface 38 surrounding its central aperture such that a portion of the radiation reflected from the beam splitter 35 is rereflected by the mirror surface 38 and beam splitter 35 back through the laser head 32 to the first end mirror 33. A portion of this multimode oscillation passing through the beam splitter 35 is reflected from the mirror 36 back to the first end mirror 33. A 100 percent reflecting mirror 39 is positioned on the side of the beam splitter 35 opposite to that of the aperture plate 37 for directing radiation from the beam splitter 35 back towards the beam splitter as indicated.

The portion of radiation reflected from the beam splitter 35 which passes through the central aperture is partially reflected by the second end mirror 34 back up through the aperture to the beam splitter 35 and then through the laser head 32 to the first end mirror 33. The second optical cavity in the arrangement of FIG. 3 is thus of L shape. In this system, the first multimode radiation output beam is coupled out of the system from the third mirror 36 as indicated at 40 and the second single mode oscillating radiation is coupled out of the system through the second end mirror 34 as at 41. Substantially all of the generated radiation energy in the laser system is utilized in the two output beams.

Figure 4:
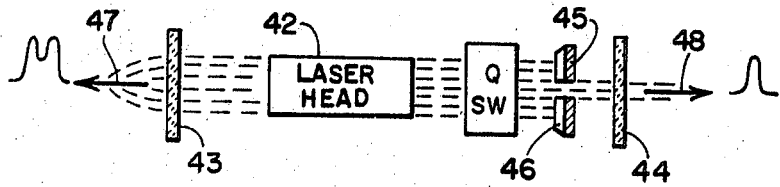
FIG. 4 is a schematic showing of a third embodiment.

In the embodiment of FIG. 4, there is shown a somewhat simplified system over those illustrated in FIGS. 2 and 3. In this embodiment, there is again provided a laser head 42 with first and second end mirrors 43 and 44 together with the Q switch as shown. An aperture plate 45 is positioned to intercept radiation from one end of the laser head 42 and includes a 100 percent reflecting surface 46 surrounding the central aperture. The first optical cavity for the laser is defined between the 100 percent reflecting surface 46 of the aperture plate 45 and the first end mirror 43. The second optical cavity for the single oscillating mode second beam is defined between the first and second end mirrors 43 and 44, this portion of the radiation passing through the central aperture of the plate 45. The first multimode oscillating beam is coupled out of the system through the first end mirror 43 as indicated by the arrow 47 and the second output beam constituting the single mode oscillation is coupled out of the second end mirror 44 as indicated at 48, these first and second end mirrors both being partially transmissive.

In both the embodiments of FIGS. 3 and 4, additional external 100 percent reflecting mirrors may be provided for directing the respective output beams in proper directions for holographic operations. Also, amplifiers (not shown) may be provided external of the laser system for providing increased energy outputs.

OPERATION

In the operation of the system of FIG. 2, the laser head 24 is repetitively light pumped and in cooperation with the Q switch and first and second optical cavities defined respectively between the first and second end mirrors and first and third end mirrors will result in the regeneration of two distinct oscillating modes derived from the same laser material in the laser head. The first oscillating mode in the example chosen constitutes a multimode oscillating radiation generated between the first end mirror 25 and third end mirror 29 in cooperation with the reflecting surface 28 on the aperture plate 27 defining the L shaped first optical cavity. This radiation, as described, is coupled out of the system as indicated at 30 through the third end mirror 29. The second output beam of single mode oscillating radiation is generated between the first and second end mirrors 25 and 26, this radiation being confined to that portion which can pass through the central aperture in the plate 27. In an actual embodiment, the aperture plate 27 and reflecting surface 28 is in the form of an eliptically shaped diagonal. If the minor axis is one inch to accomodate a 1 inch diameter beam, the major axis would be 1.41 inches for the 45° disposition illustrated. The central aperture might typically have a diameter of 2 millimeters. With this arrangement, the first multimode output beam would have an energy of approximately 1 joule and a single laser amplifier (not shown) would have an output of about 4 joules providing an improvement factor of 20 over the system described in FIG. 1.

In the embodiment of FIG. 3, a combination beam splitter and aperture plate is utilized, the first output beam being taken from the partially transmissive mirror 36 which mirror cooperates with the first end mirror 33 to provide a first optical cavity. The second single mode oscillating radiation beam is confined to the L shaped cavity and takes place between the first and second end mirrors 33 and 34 as described heretofore.

In the operation of the third embodiment illustrated in FIG. 4, only two end mirrors 43 and 44 are provided but each are made partially transmissive to couple the beams respectively out of the laser system.

It will be noted that all of the embodiments include the essential feature of an aperture plate with one surface fully 100 percent reflecting surrounding the central aperture opening. In essence, this provides the separation of distinct oscillating modes which may then be coupled out of the system by the various mirror and partially transmissive mirror arrangements described.

From the foregoing description, it will be evident that the present invention has provided an improved laser system particularly well suited for use in holography wherein the illuminating beam may be of the multimode oscillating type whereas the reference beam requires preferably a single mode output. By providing two cavities cooperating with a single laser material, the desired multi and single mode oscillations may be coupled out of this system with maximum efficiency.

Although the invention has been described with specific reference to holography and the example of the laser material itself being given as ruby, it should be understood that the two cavity laser arrangement can be used with the other lasing media including neodymium-glass and neodymium-YAG. Further, there will occur to those skilled in the art other uses for the resulting output beams aside from holography.

What is claimed is:

1. A laser system comprising: a single laser material; means including an aperture plate having a central aperture and a 100 percent reflecting surface surrounding said aperture to define part of a first optical cavity for said material providing regeneration of radiation of a first oscillating mode reflected by said aperture plate; means defining a second optical cavity for said same laser material providing regeneration of radiation of a second oscillating mode passing through the aperture in said aperture plate; means for coupling out of said system radiation of said first oscillating mode; and means for coupling out of said system radiation of said second oscillating mode whereby distinct first and second output beams of different mode oscillations and the same frequency are provided from said single laser material.

2. A system according to claim 1, in which said state is positioned to intercept laser radiation from one end of said laser material such that its reflecting surface passes a portion of said radiation back through said laser material; a first end mirror positioned to intercept radiation from the other end of said laser material and reflect at least a portion of said radiation back through said material to said reflecting surface of said aperture plate, said means defining a second optical cavity including a second end mirror which is partially transmissive positioned to intercept laser radiation passing through said aperture and reflect a portion of said radiation back through said aperture to said one end of said laser material for further reflection back through said material from said first end mirror and thence back through said aperture to said second end mirror, said second oscillating mode being coupled out of said system through said second end mirror.

3. A system according to claim 2, in which said first optical cavity includes a third end mirror which is partially transmissive positioned to intercept at least a portion of said first oscillating mode of radiation, said first oscillating mode being coupled out of said system through said third end mirror.

4. A system according to claim 3, in which said first end mirror is 100 percent reflecting, said aperture plate being positioned between said one end of said laser material and said second end mirror and disposed at a 45° angle with respect to the direction of radiation through said laser material, said third end mirror receiving and returning said first oscillating mode of radiation from said reflecting surface of said aperture plate to define an L shape for said first optical cavity.

5. A system according to claim 3, including a beam splitter positioned between said one end of said laser material and said third end mirror and disposed at a 45° angle with respect to the direction of radiation through said laser material, said aperture plate being positioned to receive radiation reflected by said beam splitter and return radiation in said first oscillating mode, said second end mirror returning radiation of said second oscillating mode to said beam splitter to define an L shape for said second optical cavity; and a 100 percent reflecting mirror positioned to the side of said beam splitter opposite to that of said aperture plate to return radiation to said beam splitter.

6. A system according to claim 2, in which said first end mirror is partially transmissive to couple out radiation of said first oscillating mode from said first optical cavity.

7. A system according to claim 2, in which said radiation of a first oscillating mode includes additional oscillating modes to define a multimode output for the first output beam from said first optical cavity, said radiation of a second oscillating mode comprising a single $TEM_{oo}$ for the second output beam from said second optical cavity.

8. A system according to claim 7, in which the energy of said first output beam is approximately from 10 to 20 times the energy of said second output beam.

* * * * *

UNITED STATES PATENT OFFICE
CERTIFICATE OF CORRECTION

Patent No. 3,663,890                Dated May 16, 1972

Inventor(s) Carl William Schulthess and Eduard Gregor

It is certified that error appears in the above-identified patent and that said Letters Patent are hereby corrected as shown below:

Column 5, line 35

Delete "state" and substitute --plate--

Signed and sealed this 12th day of September 1972.

(SEAL)
Attest:

EDWARD M. FLETCHER, JR.
Attesting Officer

ROBERT GOTTSCHALK
Commissioner of Patents